(12) United States Patent
Yi et al.

(10) Patent No.: US 8,416,509 B2
(45) Date of Patent: Apr. 9, 2013

(54) OPTICAL APPARATUS

(75) Inventors: HunJung Yi, Suwon-si (KR); Jae-Won Hahn, Seoul (KR); Seungki Chae, Seoul (KR); Chang-Hoon Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 12/641,805

(22) Filed: Dec. 18, 2009

(65) Prior Publication Data

US 2010/0200767 A1    Aug. 12, 2010

(30) Foreign Application Priority Data

Feb. 10, 2009  (KR) .................. 10-2009-0010547

(51) Int. Cl.
*G02B 9/00*      (2006.01)
(52) U.S. Cl.
USPC .................. 359/738; 250/423 R; 356/326

(58) Field of Classification Search .............. 250/423 R; 359/738; 356/326, 622
See application file for complete search history.

(56) References Cited

U.S. PATENT DOCUMENTS

| 6,086,204 A * | 7/2000 | Magnante | 351/212 |
| 2009/0323073 A1* | 12/2009 | Luber et al. | 356/448 |

FOREIGN PATENT DOCUMENTS

| JP | 10-242120 | 9/1998 |
| JP | 2006-310371 | 11/2006 |
| KR | 1020070069359 | 7/2007 |

* cited by examiner

*Primary Examiner* — Mark Hellner
(74) *Attorney, Agent, or Firm* — F. Chau & Associates, LLC

(57) ABSTRACT

An optical apparatus for plasma includes a light collection lens provided to receive optical emission spectrum from plasma, a first aperture stop disposed between the light collection lens and the plasma to block out-focused light, a second aperture stop disposed between the light collection lens and an imaging area of the light collection lens to block in-focused light, and a pinhole disposed at the imaging area of the light collection lens to limit depth of focus.

20 Claims, 3 Drawing Sheets

OPTICAL APPARATUS

CROSS-REFERENCE TO RELATED APPLICATIONS

This U.S. non-provisional patent application claims priority under 35 U.S.C. §119 to Korean Patent Application No. 10-2009-0010547, filed on Feb. 10, 2009, the disclosure of which is hereby incorporated by reference herein in it's entirety.

BACKGROUND

1. Technical Field

The present disclosure relates to optical apparatuses and, more particularly, to an optical apparatus having a spatial resolution of light emitted from plasma.

2. Description of Related Art

A plasma process has been used in etching or deposition processes for semiconductors, flat-panel displays, solar cells, and so forth. The plasma process may be performed to supply chemical species such as, for example, radicals having high reactivity to a chemical reaction of a wafer or a substrate or to supply ions having kinetic energy. An etching or deposition process may be performed by the chemical species and/or the ions. In this case, predetermined process characteristics may be dependent upon density average and distribution of the ions and/or the chemical species.

When density averages of chemical species are measured, the density of the respective chemical species may be obtained by analyzing emission spectrum emitted from plasma. In an indirect manner, a Langmuir probe is typically used to measure special distribution of chemical species. The Langmuir probe includes a probe, which functions as an electrode and is inserted into a vacuum chamber. For this reason, the Langmuir probe may not be suitable for use during a plasma process.

In addition, there are other measuring apparatuses each using an electrode. For example, a portion of a sensor acting as the electrode is inserted into a chamber. The above-mentioned measuring apparatuses typically all measure change in electrical characteristics of plasma. Accordingly, each of the measuring apparatuses may indirectly measure only density average of all chemical species through electrical characteristics of plasma, not through density of the respective chemical species.

SUMMARY

Exemplary embodiments of the present invention provide an optical apparatus for plasma. In an exemplary embodiment, the optical apparatus may include a light collection lens provided to receive optical emission spectrum from plasma, a first aperture stop disposed between the light collection lens and the plasma to block out-focused light, a second aperture stop disposed between the light collection lens and an imaging area of the light collection lens to block in-focused light, and a pinhole disposed at the imaging area of the light collection lens to limit depth of focus.

In some embodiments, a distance between the pinhole and the light collection lens is variable.

In some embodiments, a distance between the first aperture stop and the light collection lens may be fixed.

In some embodiments, the optical apparatus may further include an accumulated light source removing unit disposed at a back-end of the pinhole.

In some embodiments, the accumulated light source removing unit may include at least one of a first lens, a second lens, and an aperture stop disposed between the first lens and the second lens.

In some embodiments, the optical apparatus may further include at least one of a light transmitting unit configured to transmit light passing the accumulated light source removing unit to a predetermined position after receiving the light, a spectrum unit configured to measure an intensity of output light received from the light transmitting unit according to wavelength, and a control unit configured to receive and process an output signal of the spectrum unit.

In some embodiments, the optical apparatus may further include an align unit disposed between the second aperture stop and the pinhole to determine whether the second aperture stop and the pinhole are aligned with each other by changing a path of light passing the light collection lens.

In some embodiments, the optical apparatus may further include at least one of a movable mirror provided to change a path of light passing the second aperture stop, a reticle provided to confirm a position of light reflected from the mirror, an align lens provided to concentrate light passing the reticle, and a sensing unit provided to receive light passing the align lens.

In some embodiments, the optical apparatus may further include a frame where the light collection lens, the first aperture stop, the second aperture stop, and the pinhole are mounted. The frame may be provided to vary a distance between the light collection lens and the plasma.

In some embodiments, the optical apparatus may further include a lens transporting unit where the light collection lens and the first aperture stop are mounted. The lens transporting unit may be provided to adjust a distance between the light collection lens and the pinhole.

In another exemplary embodiment, an optical apparatus is provided. The optical apparatus includes a light collecting lens, a plasma generator includes a chamber, an energy applying unit and a window, wherein the light collecting lens is configured to receive an optical emission spectrum emitted from an object area through the window of the plasma generator. The optical apparatus further includes a first aperture stop disposed between the light collection lens and the window to block out-focused light, a second aperture stop disposed between the light collection lens and an imaging area of the light collection lens to block in-focused light, a pinhole disposed at an imaging area of the light collecting lens to limit depth of focus (DOF) of the object area, an accumulated light source disposed at a back-end of the pinhole, a light transmitting unit disposed at a back-end of the accumulated light source removing unit, wherein the accumulated light source removing unit concentrates and transmits the light passing the pinhole to the light transmitting unit. Moreover, the optical apparatus also includes a spectrum unit configured to measure an intensity of output light received from the light transmitting unit according to wavelength, a control unit configured to receive an output signal of the spectrum unit to process the received signal, an align unit disposed between the second aperture stop and the pinhole to change a path of light passing the light collection lens, a movable frame including movable means, wherein the light collection lens, the first aperture stop, the second aperture stop and the pinhole are mounted on the movable frame and a lens transporting unit mounted on the movable frame.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention.

Figure 1:
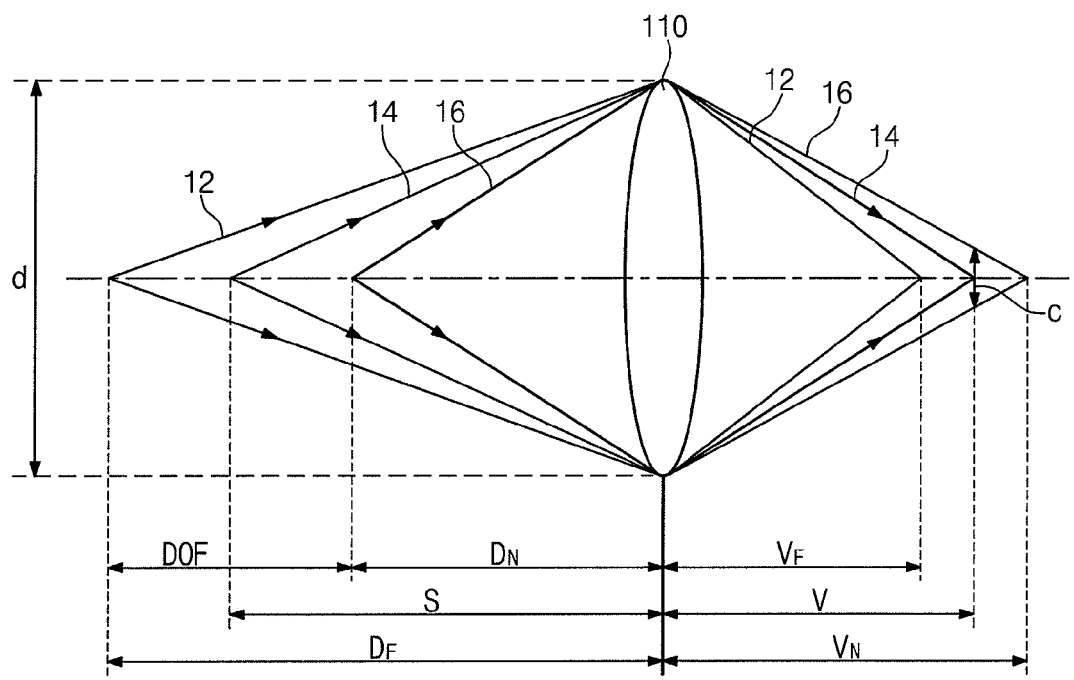
FIG. 1 illustrates an optical apparatus according to an exemplary embodiment of the present invention.

DETAILED DESCRIPTION OF THE
EXEMPLARY EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. In the drawings, the thicknesses of layers and regions are exaggerated for clarity. Like numbers refer to like elements throughout.

To obtain the desired process characteristics at a plasma generator, it may be necessary to know the plasma density and/or the radical density. The radical density may require measurement of spatial average as well as spatial distribution. As the critical dimension of semiconductor devices continues to shrink, it may become necessary to more minutely control a process distribution. Higher process uniformity may be required with the increase in diameter of wafers and the size of plasma generators.

When a process is not performed, process uniformity may be measured by inserting a probe into a plasma system. This manner is mainly used to develop the plasma system. However, even when the process is performed, it may be necessary to measure plasma uniformity and radical uniformity inside the plasma system. When the process is performed, the insertion of the probe may have an influence upon a chemical reaction inside the plasma system. Accordingly, there may be a requirement for real-time analysis which is capable of fully covering a process performed for a short time without introduction of variables having an influence upon the chemical reaction. An optical apparatus according to embodiments of the present invention may have spatial resolution among optical emission spectrum of plasma and extract only signals within a specific range.

FIG. 1 illustrates an optical apparatus according to some embodiments of the present invention.

Referring to FIG. 1, a spatial resolution of the optical apparatus may be dependent upon depth of focus (DOF). An object distance (S) between a light collection lens 110 and an object may be longer than a focal length. A distance between an object-imaged position and the light collection lens may be an image distance (V). Ray 14 running from the object may pass an optical axis on the image distance (V). The DOF may mean a front-to-back distance of an image plane capable of determining that a focus is correct. A circle of confusion may be set to determine the DOF. A diameter of the circle of the confusion may be "c". Distances of spots that are pertinent to the range of the DOF existing at the front and back of the image distance (V) corresponding to the circle of confusion may be a front image distance $V_F$ and a back image distance $V_N$. The front and back image distances $V_F$ and $V_N$ may be determined based on the light collection lens 110. Object distances corresponding to the front and back image distances $V_F$ and $V_N$ may be a front object distance $D_F$ and a back object distance $D_N$, respectively. The front and back object distances $D_F$ and $D_N$ may be determined by a distance from the light collection lens 110. A distance between the front and back object distances $D_F$ and $D_N$ may be the DOF. Ray 12 running from the front object distance $D_F$ may pass the front image distance $V_F$. Ray 16 running from the back object distance $D_N$ may pass the back image distance $V_N$.

The light collection lens 110 may have a focal length (f) and f number (N) and satisfy the geometrical condition set forth below. A diameter of the circle of confusion may be "c". A diameter of the light collection lens 110 may be "d".

$$\frac{v_N - v}{v_N} = \frac{c}{d} \qquad \text{[Equation 1]}$$

$$\frac{v - v_F}{v_F} = \frac{c}{d}$$

$$N = \frac{f}{d}$$

The Equation 1 may be expressed as set forth below.

$$v_N = \frac{fv}{f - Nc} \qquad \text{[Equation 2]}$$

$$v_F = \frac{fv}{f + Nc}$$

$$\frac{1}{s} + \frac{1}{v} = \frac{1}{f} \qquad \text{[Equation 3]}$$

The Equation 2 may be obtained by converting the Equation 1. If the front object distance $D_F$ and the front object distance $D_N$ are substituted into a lens formula of the Equation 3, they may be expressed as set forth below.

$$D_F = \frac{sf^2}{f^2 - \frac{f}{d}c(s-f)} \qquad \text{[Equation 4]}$$

$$D_N = \frac{sf^2}{f^2 + \frac{f}{d}c(s-f)}$$

The depth of focus (DOF) may be expressed by a difference between the front object distance $D_F$ and the front object distance $D_N$, as set forth below.

$$DOF = D_F - D_N = \frac{sf^2}{f^2 - \frac{f}{d}c(s-f)} - \frac{sf^2}{f^2 + \frac{f}{d}c(s-f)} \qquad \text{[Equation 5]}$$

The DOF may be dependent upon the physical characteristics (f) and (d) of the light collection lens 110 and the object distance (S). The object distance (S) may be expressed with the focal length (f) and the image distance (V) by means of the Equation 3. As a result, the DOF may be dependent upon the physical characteristics of the light collection lens, the image distance V, and the diameter (c) of the circle of confusion.

Figure 2:
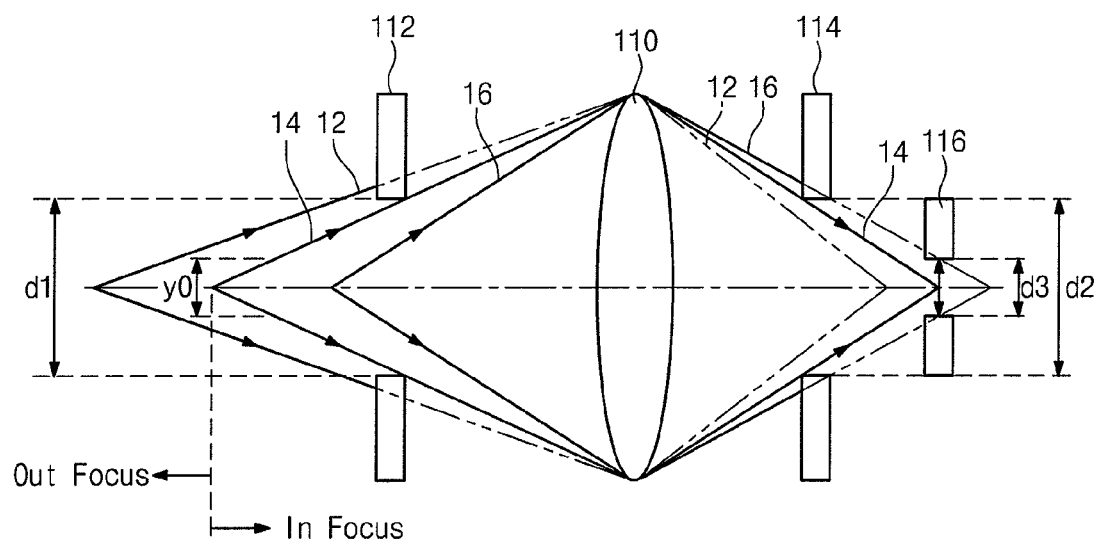
FIG. 2 illustrates an optical apparatus according to an exemplary embodiment of the present invention.

FIG. 2 illustrates an optical apparatus according to other embodiments of the present invention.

Referring to FIG. 2, the optical apparatus may include a first aperture stop 112, a second aperture stop 114, a pinhole 116, and a light collection lens 110, which are provided to improve a spatial resolution. The light collection lens 110 may be disposed between the first aperture stop 112 and the second aperture stop 114.

The light collection lens 110 may have a restrictive function in collecting a part of energy emitted from a point light source. Therefore, a diameter (d) of the light collection lens 110 may determine the amount of rays which run into the optical apparatus to form an image. An element determining the amount of rays reaching an image may be, for example, an aperture stop. The aperture stop may be the frame of the light collection lens 110 or a separate element. The aperture stop may decrease the intensity of marginal rays impinging on the light collection lens 110 from an accumulated light source. The aperture stop may decrease the influence of a light source except an object plane.

The pinhole 116 may be an element restricting the size and/or angle of an object which may be imaged. A diameter of the pinhole 116 may be "d3", which may, for example, match the diameter (c) of the circle of confusion set forth in FIG. 1. The pinhole 116 may function as a field stop. The aperture stop may control the number of rays reaching a conjugate image point from an object on a front distance and serve to block light running into the pinhole 116.

The first aperture stop 112 and the second aperture stop 114 may block marginal rays entering from an accumulated light source. The first aperture stop 112 may block a part of the rays of an out-focus light source which is farther than the object distance (S). The second aperture stop 114 may block a part of the rays of an in-focus light source which is nearer than the object distance (S). The pinhole 116 may block rays that are defocused to impinge, attenuating the influence of the rays running from an area except an object area. The size of an image may be used to determine whether the rays are defocused.

A spatial resolution on a focal axis of the optical apparatus may be dependent upon depth of focus (DOF), as previously set forth in FIG. 1. The measured intensity (y0) of a light source disposed at the object plane may be dependent upon the magnification (M) of the optical apparatus. That is, the magnification (M) may be determined by a ratio of the intensity (y0) of the light source disposed at the object plane to the diameter (d3) of the pinhole 116. In addition, the magnification (M) may be determined as a function of the focal length (f) and the image distance (V) of the light collection lens 110.

Figure 3:
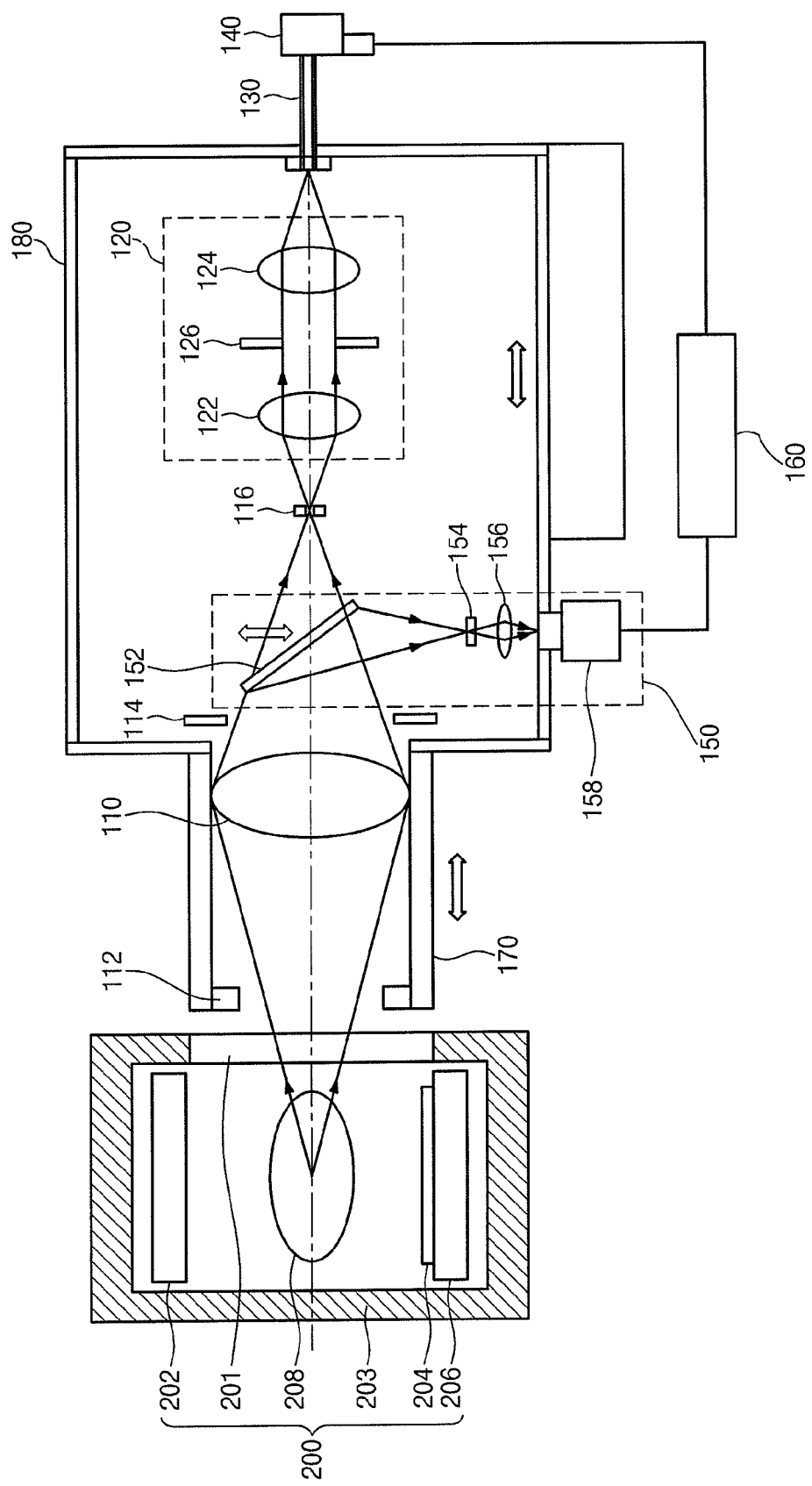
FIG. 3 illustrates an optical apparatus according to an exemplary embodiment of the present invention.

FIG. 3 illustrates an optical apparatus according to still other embodiments of the present invention.

Referring to FIG. 3, the optical apparatus includes a light collection lens 110 receiving an optical emission spectrum emitted from an object area through a window 201 of a plasma generator 200, a first aperture stop 112 disposed between the light collection lens 110 and the window 201 to block out-focused light, a second aperture stop 114 disposed between the light collection lens 110 and an imaging area of the light collection lens 110 to block in-focused light, and a pinhole 116 disposed to the imaging area of the light collection lens 110 to limit depth of focus (DOF) of the object area. An image distance between the pinhole 116 and the light collection lens 110 may be varied.

The plasma generator 200 may include a chamber 203 and energy applying unit 202. The energy applying unit 202 may generate DC, AC, RF or microwave plasma. The plasma generator 200 may include a substrate holder 206 and a substrate 204 disposed at the substrate holder 206. The substrate holder 206 may include another energy applying unit. The substrate 204 may include at least one of a semiconductor substrate, a metal substrate, and a glass substrate. The plasma generator 200 may include at least one window 201. Use of the plasma generator 200 is not limited to treatment for substrates and may extend to treatment of, for example, fibers and organic matters.

The window 201 allows rays to transmit, for example, the ultraviolet, infrared or visible ray band. The window 201 may be made of, for example, glass or quartz. The window 201 may be substituted with another light-transmittable material. The window 201 may be disposed at a side surface of the chamber 203. Alternatively, the window 201 may be disposed at a top surface or an exhaust unit of the chamber 203. The window 201 may be anti-reflectively coated and have a constant transmittance according to wavelength.

The light collection lens 110 may be an achromatic lens having a constant focal length at a predetermined wavelength band. Inner diameters of the first aperture stop 112 and the second aperture stop 114 are controllable. A distance between the first aperture stop 112 and the light collection lens 110 may be fixed.

The light collection lens 110 allows light emitted from a light source to impinge on the optical apparatus. The DOF of the optical apparatus may be dependent upon a focal length and a diameter of the light collection lens 110. The first aperture stop 112 may restrict incident rays at an out-focused position. Similar to the first aperture 112, the second aperture stop 114 may restrict emitted rays at an in-focused position.

The pinhole 116 may block rays, which are defocused to impinge on the pinhole 116, to restrict the size and/or angle of an object that may be imaged. The size of the pinhole 116 may be determined according to the design rule set forth in FIG. 1. The size of the pinhole 116 may be, for example, tens of micrometers.

An accumulated light source removing unit 120 may be disposed at the back-end of the pinhole 116. The accumulated light source removing unit 120 may include a first lens 122, a second lens 124, and an aperture stop 126 disposed between the first and second lenses 112 and 124. A focus of the first lens 122 may match a position of the pinhole 116. The first lens 122 may output parallel light, and the second lens 124 may receive the parallel light and concentrate the received light on the focus of the second lens 124. The aperture stop 126 may remove light passing the pinhole 116 at an off-axis light source. The accumulated light source removing unit 120 may concentrate and transmit the light passing the pinhole 116 to a light transmitting unit 130.

The light transmitting unit 130 may be disposed at the back-end of the accumulated light source removing unit 120. The light transmitting unit 130 may be disposed at a spectrum unit 140 and the accumulated light source removing unit 120 to transmit output light of the accumulated light source removing unit 120 to the spectrum unit 140. The light transmitting unit 130 may be, for example, an optical fiber, which may be a multi-mode fiber.

Output light of the light transmitting unit 130 may be provided to the spectrum unit 140. The spectrum unit 140 may spectrally split input light according to wavelength and measure the intensity of light according to wavelength. The intensity of light may be measured by an, for example, optical sensing unit, which may include an optical sensor array. Thus, the intensity of light according to wavelength may be measured at the same time. The optical sensing unit may include, for example, at least one of a charge coupled device (CCD), a photomultiplier (PM) tube, a CMOS image sensor (CIS), and a photodiode.

A control unit 160 may receive an output signal of the spectrum unit 140 to process the received signal. The control unit 160 may be, for example, a computer. Communication between the control unit 160 and the spectrum unit 140 may be done in a wired or wireless environment by means of a communication system.

An align unit 150 may be disposed between the second aperture stop 114 and the pinhole 116 to change a path of light passing the light collection lens 110. The align unit 150 may be configured to determine whether the light passing the light collection lens 110 is aligned with the pinhole 116. In addition, the align unit 150 may be configured to confirm the object area. The align unit 150 may include, for example, a mirror 152 provided to change a path of light passing the second aperture stop 114, a reticle 154 provided to check a position of light reflected from the mirror 152, an align lens 156 provided to concentrate light passing the reticle 154, and a sensing unit 158 configured to detect light passing the align lens 156.

The mirror 152 may perpendicularly travel on an optical axis of the light collection lens 110. The mirror 152 may be inclined at an angle of about 45 degrees to the optical axis to change a path of the output light of the light collection lens 110 by about 90 degrees.

The reticle 154 may be made of a material with a good transmittance. The reticle 154 may include a radial line which indicates a relationship between the object area and the optical axis. It is therefore possible to determine whether the light collection lens 110 and the pinhole 116 are aligned with each other, according to the size and position of an image focused on the reticle 154. Light passing the reticle 154 may be collected to a focus through the align lens 156. The sensing unit 158 may be disposed at the focus of the align lens 156. The sensing unit 158 may include, for example, optical sensors that are 2-dimensionally arranged. An output signal of the sensing unit 158 may be provided to the control unit 160 to be monitored in real time.

The light collection lens 110, the first aperture stop 112, the second aperture stop 114, and the pinhole 116 may be mounted at a frame 180. The frame 180 may be movable such that it may adjust a distance between the light collection lens 110 and the window 201. Alternatively, because a distance between the light collection lens 110 and the plasma generator 200 may be varied, an object distance of the optical apparatus may be varied to measure an intensity distribution of spatial light.

A lens transporting unit 170 may be mounted at the frame 180. A distance between the frame 180 and the window 201 may be fixed. The light collection lens 110 and the first aperture stop 112 may be mounted on the lens transporting unit 170. The lens transporting unit 170 may be provided to adjust a distance between the frame 180 and the light collection unit 110. Alternatively, the lens transporting unit 170 may be provided to adjust a distance between the light collection lens 110 and the pinhole 116. Thus, the optical apparatus may measure a spatial distribution of light emitted from plasma.

As explained so far, the optical apparatus according to exemplary embodiments of the present invention can improve spatial resolution at an optical emission spectrum of plasma.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An optical apparatus, comprising:
   a light collection lens provided to receive optical emission spectrum from plasma;
   a first aperture stop disposed between the light collection lens and the plasma to block out-focused light;
   a second aperture stop disposed between the light collection lens and an imaging area of the light collection lens to block in-focused light; and
   a pinhole disposed at the imaging area of the light collection lens to limit depth of focus.

2. The optical apparatus of claim 1, wherein a distance between the pinhole and the light collection lens is variable.

3. The optical apparatus of claim 1, wherein a distance between the first aperture stop and the light collection lens is fixed.

4. The optical apparatus of claim 1, further comprising:
   an accumulated light source removing unit disposed at a back-end of the pinhole.

5. The optical apparatus of claim 4, wherein the accumulated light source removing unit comprises:
   a first lens;
   a second lens; and
   an aperture stop disposed between the first lens and the second lens.

6. The optical apparatus of claim 4, further comprising:
   a light transmitting unit configured to transmit light passing the accumulated light source removing unit to a predetermined position after receiving the light;
   a spectrum unit configured to measure an intensity of output light received from the light transmitting unit according to wavelength; and
   a control unit configured to receive and process an output signal of the spectrum unit.

7. The optical apparatus of claim 1, further comprising:
   an align unit disposed between the second aperture stop and the pinhole to determine whether the second aperture stop and the pinhole are aligned with each other by changing a path of light passing the light collection lens.

8. The optical apparatus of claim 1, wherein the align unit comprises:
   a movable mirror provided to change a path of light passing the second aperture stop;
   a reticle provided to confirm a position of light reflected from the mirror;
   an align lens provided to concentrate light passing the reticle; and
   a sensing unit provided to receive light passing the align lens.

9. The optical apparatus of claim 1, further comprising:
   a frame where the light collection lens, the first aperture stop, the second aperture stop, and the pinhole are mounted, and wherein the frame being provided to vary a distance between the light collection lens and the plasma.

10. The optical apparatus of claim 1, further comprising:
    a lens transporting unit where the light collection lens and the first aperture stop are mounted, and wherein the lens transporting unit being provided to adjust a distance between the light collection lens and the pinhole.

11. An optical apparatus comprising:
    a light collecting lens;
    a plasma generator comprising a chamber, an energy applying unit means and a window, wherein the light collecting lens is configured to receive an optical emission spectrum emitted from an object area through the window of the plasma generator;
    a first aperture stop disposed between the light collection lens and the window to block out-focused light;

a second aperture stop disposed between the light collection lens and an imaging area of the light collection lens to block in-focused light;

a pinhole disposed at an imaging area of the light collecting lens to limit depth of focus (DOF) of the object area;

an accumulated light source removing unit disposed at a back-end of the pinhole;

a light transmitting unit disposed at a back-end of the accumulated light source removing unit, wherein the accumulated light source removing unit concentrates and transmits the light passing the pinhole to the light transmitting unit;

a spectrum unit configured to measure an intensity of output light received from the light transmitting unit according to wavelength;

a control unit configured to receive an output signal of the spectrum unit to process the received signal;

an align unit disposed between the second aperture stop and the pinhole to change a path of light passing the light collection lens;

a movable frame, wherein the light collection lens, the first aperture stop, the second aperture stop and the pin hole are mounted on the movable frame; and a lens transporting unit mounted on the movable frame.

12. The optical apparatus of claim 11, wherein the plasma generator further comprises a substrate holder and a substrate disposed on the substrate holder.

13. The optical apparatus of claim 11, wherein the window of the plasma generator allows rays to transmit ultraviolet, infrared or visible ray band and wherein the window is made of glass or quartz.

14. The optical apparatus of claim 11, wherein the window is disposed at a side surface of the chamber.

15. The optical apparatus of claim 11, wherein the window is disposed at a top surface of the chamber or an exhaust unit of the chamber.

16. The optical apparatus of claim 11, wherein the window is anti-reflectively coated and has a constant transmittance according to wavelength.

17. The optical apparatus of claim 11, wherein the accumulated light source removing unit includes a first lens, a second lens, and an aperture stop disposed between the first and second lenses.

18. The optical apparatus of claim 17, wherein the focus of the first lens matches a position of the pinhole, wherein the first lens is configured to output parallel light, wherein the second lens is configured to receive parallel light and concentrates the received light on the focus of the second lens, and wherein the aperture stop is configured to remove light passing the pinhole at an off-axis light source.

19. The optical apparatus of claim 11, wherein the align unit includes a mirror which is configured to change a path of light passing the second aperture stop, a reticle configured to check a position of light reflected from the mirror, an align lens configured to concentrate light passing the reticle, and a sensing unit configured to detect light passing the align lens.

20. The optical apparatus of claim 11, wherein the lens transporting unit is provided to adjust a distance between the light collection lens and the pinhole.

* * * * *